United States Patent [19]

Fujioka et al.

[11] 4,444,847

[45] Apr. 24, 1984

[54] ELECTROSTATIC RECORD MATERIAL

[75] Inventors: Hironari Fujioka, Takatsuki; Hisanori Yagi, Nishinomiya, both of Japan

[73] Assignee: Kanzaki Paper Manufacturing Company, Limited, Tokyo, Japan

[21] Appl. No.: 160,675

[22] Filed: Jun. 18, 1980

[30] Foreign Application Priority Data

Jun. 25, 1979 [JP] Japan ................................ 54/80481

[51] Int. Cl.³ .................... G01D 15/24; G01D 15/26; G03G 16/00; B32B 27/30

[52] U.S. Cl. .................................. 428/522; 428/696; 428/537.5; 428/488.1; 346/135.1; 430/48

[58] Field of Search .............. 428/457, 469, 472, 537, 428/539, 522, 689, 696, 679; 346/153, 158, 159, 135.1; 430/48, 60, 52

[56] References Cited

U.S. PATENT DOCUMENTS 3,418,640 12/1968 Werner ............................ 346/158

3,784,398 1/1974 Metcalfe et al. .................... 430/48

4,022,528 5/1977 Jackson ............................ 346/159

4,097,637 6/1978 Loria et al. .................... 346/153.1

FOREIGN PATENT DOCUMENTS 51-25140 3/1976 Japan ................................ 428/537

*Primary Examiner*—Edward C. Kimlin

*Assistant Examiner*—Louis Falasco

*Attorney, Agent, or Firm*—Armstrong, Nikaido, Marmelstein & Kubovcik

[57] ABSTRACT

An electrostatic record material comprising an electroconductive base sheet and a record layer formed on the base sheet and consisting essentially of an insulating resin, the record material being characterized in that the base sheet includes (i) an electroconductive layer comprising an ionic-conductive substance as its main electroconductive component, and (ii) an electroconductive layer comprising an electronic-conductive substance as its main electroconductive component. The electrostatic record material has excellent recording characteristics at usual humidity.

3 Claims, No Drawings

ELECTROSTATIC RECORD MATERIAL

This invention relates to an electrostatic record material, and more particularly to an electrostatic record material comprising an electroconductive base sheet and a record layer forming on the base sheet and consisting essentially of insulating resin.

Electrostatic recording processes use a record material comprising an electroconductive base sheet and a record layer formed on the base sheet and composed mainly of insulating resin. With these processes, voltage pulses are applied directly to the record layer of the material or electrostatic latent images formed on a plate are transferred onto the record layer to form electrostatic latent images on the record layer, and the latent images are converted to visible images with a toner. Electrostatic recording processes are widely used for facsimile systems, copying machines and other printers.

While facsimile systems were operated at a low speed of 5 to 6 min/A-4-size sheet, such low-speed machines have been replaced by medium-speed machines (2-3 min/A-4-size sheet) or high-speed machines (1 min/A-4-size sheet or higher) with an increase in the amount of information to be handled. Accordingly the voltage pulse width used has changed from 500 $\mu$.sec or longer to 50–100 $\mu$.sec to 20 $\mu$.sec or shorter. To obtain satisfactory records with stability in accordance with the various changes attendant on the speed-up of the facsimile systems, the electrostatic record material must have reduced impedance. Most suitably the electroconductive base sheet of the electrostatic record material usually has a surface electrical resistivity of $10^6$ to $10^{10}$ ohms. Especially for use in high-speed facsimile systems, the record material must meet a very strict resistivity requirement. For example, a reduced image density will result at a surface electrical resistivity of $10^{11}$ ohms, and little or no record will be reproduced at $10^{12}$ ohms. Accordingly the electroconductive base sheet of record material for use in usual facsimile processes is adapted to have a resistivity of $10^6$ to $10^{10}$ ohms at usual humidity, but the conductive base sheet has a higher resistivity in an atmosphere of lower humidity because the treating agent usually used for rendering the base sheet electroconductive is an electroconductive resin the degree of ionization of which reduces with a decrease in the moisture content of the base sheet to give a lower conductivity, namely a higher resistivity.

An electrostatic record material has been developed which is free of the drawback resulting from the use of such an electroconductive resin (Published Unexamined Japanese Patent Application No. 25140/1976). In place of the conventional electroconductive resin, a zinc oxide powder having a specific resistivity of $1\times10^3$ to $9\times10^5$ ohm-cm is used for this material. The material, however, still has the following drawbacks. When the zinc oxide powder having such a specific resistivity is used with a water-soluble or water-dispersible adhesive such as polyvinyl alcohol, methyl cellulose, styrene-butadiene copolymer or the like, the resulting material will have reduced conductivity, consequently giving a record of low density. For this reason, the adhesives usable with the powder are limited to those of the organic solvent type incroporating methyl methacrylate, ethyl methacrylate, styrene, melamine, cellulose acetate, vinyl acetate or like polymer, acrylic monomer-styrene copolymer, vinyl chloride-vinyl acetate copolymer, or like resin which is soluble in organic solvents. The use of the organic solvent nevertheless entails various drawbacks such as inconvenience of handling, hazard of fire and expensiveness.

We have conducted continued research to overcome the drawbacks of electrostatic record materials of the type described and to provide a novel electroconductive material useful as a substitute for high-molecular-weight electrolytes heretofore known. In the course of the research, we found that when a zinc oxide powder having a specific resistivity of 0.01 to 500 ohm-cm at pressure of 150 kg/cm$^2$ was used as an electroconductive material, a record material was obtained which had a satisfactory conductivity even at low humidities, and that the specific zinc oxide powder, when used conjointly with a cationic organic high-molecular-weight electrolyte, gave a record material having a stable conductivity at low to high humidities. These novel findings led us to accomplish an invention which has been filed as U.S. patent application Ser. No. 53424, now U.S. Pat. No. 4,250,228. Also based on the above findings, we accomplished another invention which has been filed as U.S. patent application Ser. No. 58,941.

While the record materials of these inventions are capable of recording images with good stability in atmospheres of low to high humidities, without permitting variations in the ambient humidity to substantially influence the images, it is more desirable that the record materials have further improved recording characteristics in atmospheres of ordinary humidity in which they are usually used most frequently.

Accordingly the main object of the invention is to provide an electrostatic recording material which is capable of recording images with high stability in atmospheres of low to high humidities and which exhibits outstanding recording characteristics at an ordinary humidity.

The above object and other features of the invention will become apparent from the following description.

The electrostatic record material of this invention comprises an electroconductive base sheet and a record layer formed on the base sheet and consisting essentially of an insulating resin and is characterized in that the base sheet includes (i) an electroconductive layer comprising an ionic-conduction substance as its main electroconductive component, and (ii) an electroconductive layer comprising an electronic-conductive substance as its main electroconductive component.

The electrostatic record materials heretofore known and comprising an electroconductive base sheet and a record layer formed on the base sheet and consisting chiefly of insulating resin include none of those in which the conductive base sheet comprises two layers. Accordingly a base sheet has in no way been known which includes the two layers of: (i) an electroconductive layer comprising an ionic-conductive substance as the main electroconductive component, and (ii) an electroconductive layer comprising an electronic-conductive substance as the main electroconductive component. Our research has revealed that when an electrostatic record material is prepared with use of an electroconductive base sheet which includes these two specific layers, the record material is capable of recording images with high stability in atmospheres of low to high humidities and exhibits outstanding recording characteristics at an ordinary humidity.

The ionic-conductive substances useful in this invention are those which are predominently contained in an electroconductive layer to give the layer a surface resistivity of $10^5$–$10^{11}$ ohms, preferably $10^6$–$10^{10}$ ohms, under the condition of 10–80% RH. Exemplary of such substances are chlorides, nitrates, anionic or cationic electroconductive resins, electroconductive extender pigments and antistatic agents. More specific examples are chlorides of alkali metals or alkaline earth metals, such as lithium chloride, sodium chloride, potassium chloride, magnesium chloride, calcium chloride, strontium chloride, barium chloride, etc.; nitrates of alkali metals or alkaline earth metals, such as lithium nitrate, sodium nitrate, potassium nitrate, magnesium nitrate, calcium nitrate, barium ritrate, etc.; anionic or cationic electroconductive resins, such as sodium polystyrenesulfonate, sodium polyacrylate, polyvinylbenzyltrimethyl ammonium chloride, polydiallyldimethyl ammonium chloride, polyvinyltrimethyl ammonium chloride, etc.; electroconductive extender pigments, such as alumina sol, silica gel, metastannic acid sol, zeolite, etc.; and antistatic agents, such as stearyltrimethyl ammonium chloride, lauryltrimethyl ammonium chloride, sulfuric acid ester of sodium ricinoleate

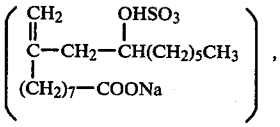

sodium alkylbenzenesulfonate, etc.

The electronic-conductive substances useful in this invention are those having a specific resistivity of $10^{-2}$ to $10^3$ ohm-cm, preferably $10^{-2}$ to 850 ohm-cm, at pressure of 150 kg/cm$^2$. Exemplary of such substances are metallic halides, metallic oxides, metallic sulfides, intermetallic compounds, metallic compound oxides, carbon black, etc. More specific examples are metallic halides, such as AgCl, AgI, CuCl, CuI, etc.; metallic oxides, such as $TiO_2$, $Tl_2O$, $Al_2O_3$, $Ta_2O_3$, $SnO_2$, PbO, ZnO, etc.; metallic sulfides, such as ZnS, etc.; intermetallic compounds, such as InSb, $Mg_2Si$, ZnSb, AlSb, InAs, InSb, AlP, GaP, InP, etc.; and metallic compound oxides, such as Cu(SCN), $SnZn_2O_4$, $TiZnO_4$, $SrTiO_3$, $CaTiO_3$, $SrZnO_3$, etc. The most preferable of these examples are $TiO_2$, $SnO_2$, ZnO and CuI which have a specific resistivity in the above-specified range.

The layer comprising an ionic-conductive substance or an electronic-conductive substance as its main electroconductive component is formed on a substrate usually by preparing a coating composition containing the main component, and applying the composition to the substrate with a usual means, such as bar coater, air knife coater, blade coater or the like, or impregnating the substrate with the composition by a size-press. When the ionic-conductive substance itself has adhering properties as is the case with electroconductive resins, it is not always necessary to use another adhesive component in combination with the substance for the preparation of the composition containing the ionic-conductive substance. Otherwise, an adhesive component is usually used conjointly with the substance. Useful adhesive components are a wide variety of materials which are used as adhesive components of electrostatic record materials of the type described and which include, for example, polyvinyl alcohol, methyl cellulose, hydroxyethyl cellulose, starch, modified starch, styrene-butadiene copolymer latex, vinyl acetate latex, acrylic acid latex, isobutent-maleic anhydride copolymer salt, styrene-maleic anhydride copolymer salt, sodium polyacrylate, polyvinylbenzyltrimethyl ammonium chloride, polydiallyldimethyl ammonium chloride and like water-soluble or water-dispersible adhesive materials. When desired, various additives can be incorporated into the coating composition. Examples of useful additives are inorganic or organic pigments, such as clay, kaolin, aluminum hydroxide, aluminum oxide, calcium carbonate, barium sulfate, fine particles of polystyrene, etc., defoaming agents, dispersants, dyes, ultraviolet absorbers, etc.

For the preparation of the coating composition containing an electronic-conductive substance, an adhesive material, such as those exemplified above, is used conjointly with the electronic-conductive substance, since the substance itself usually does not have adhering properties. Various additives can be similarly incorporated into the composition.

The coating composition is applied to the substrate in an amount of about 0.5 to about 10 g/m$^2$ by dry weight for the formation of the layer of ionic-conductive substance, or in an amount of about 2 to about 20 g/m$^2$ by dry weight for the formation of the layer of electronic-conductive substance.

According to the invention, the layer of ionic-conductive substance may contain an amount of electronic-conductive substance insofar as the ionic-conductive substance is predominant, and conversely, the layer of electronic-conductive substance may contain an amount of ionic-conductive substance such that the electronic-conductive substance predominates this layer. With the present invention, the ionic-conductive substance layer and the electronic-conductive substance layer can be formed over the substrate in either order, that is, either one of these layers may be positioned over the other.

According to the invention, the record layer can be any of those heretofore known. The coating composition for preparing the record layer can be any of those of the organic solvent type or aqueous dispersion type heretofore known. Useful compositions are organic solvent solutions or aqueous dispersions of insulating resins including polymers or copolymers of vinyl monomers, such as vinyl chloride, vinyl acetate, vinyl acetal, vinylidene chloride, ethylene, styrene, butadiene, acrylate, methacrylate, acrylonitrile, acrylic acid and methacrylic acid, silicone resin, polyester resin, polyurethane resin, alkyd resin, epoxy resin. Such resins are usable singly or in admixture. The coating composition may have incorporated therein additives which are usually used in the art, such as inorganic pigments, fine particles of polymers, starch powder, dyes, etc. The composition can be applied to the base sheet by usual means in a usual manner. The amount of the composition to be applied, although not particularly limited, is usually 2 to 10 g/m$^2$, preferably 4 to 7 g/m$^2$, by dry weight.

While some of the conventional electrostatic record materials include an electroconductive layer on one side of the base sheet opposite to the record layer, such a conductive layer can also be formed on the base sheet of this invention when so desired. The electroconductive layer need not always be limited to the specific conductive layer of this invention but can be prepared from a usual high-molecular-weight electrolyte.

The present invention will be described below in greater detail with reference to the following examples and comparison examples. However, the invention is not limited to the examples. The parts and percentages in these examples are all by weight unless otherwise indicated.

EXAMPLE 1

A 36% aqueous solution (152 parts) of polyvinylbenzyltrimethyl ammonium chloride (trade mark "ECR-77," product of The Dow Chemical Co., U.S.A.), 40 parts of calcium carbonate (trade mark, "Whiton SB," product of SHIRAISHI KOGYO CO., LTD., Japan), 50 parts of 10% aqueous solution of polyvinyl alcohol (trade mark "PVA-105," product of Kuraray Co., Ltd., Japan) and 150 parts of water are mixed together to obtain a coating composition, which is then applied to one side of wood free paper, weighing 49 g/m$^2$, by a coating rod in an amount of 4 g/m$^2$ by dry weight. The coated paper is dried in a hot air dryer at 100° C. for one minute to form an electroconductive layer comprising an ionic-conductive substance as the main electroconductive component. The layer has a surface resistivity of $8\times10^6$ ohms (20° C., 40% RH).

Separately an aqueous solution of $Al(NO_3)_2.9H_2O$ (special grade) is admixed, in an amount of 0.5 mole % calculated as $Al_2O_3$, with zinc oxide (product of Hakusui Kagaku Co., Ltd., Japan), and the mixture is thoroughly mixed, dried at 100° C. and pulverized. The powder obtained is heated in a muffle furnace at 900° C. for 90 minutes to obtain an electroconductive zinc oxide powder having a specific resistivily of 11 ohm-cm at pressure of 150 kg/cm$^2$.

The specific resistivity of the zinc oxide powder is measured by the following method. A portion of the powder is allowed to stand at 20° C. and 60% RH for 2 hours, and 240 to 260 mg of the powder is then placed into a polytetrafluoroethylene container with a specimen tube 4.1 mm in diameter. Solid cylinders of brass, 4 mm in diameter, are forced into the specimen tube from opposite ends thereof to apply varying pressures to the powder filing the tube. The volume resistivity of the powder is measured at four pressure values in the range of 100 to 200 kg/cm$^2$. The specific resistivity of the powder at 150 kg/cm$^2$ is determined from a curve obtained by plotting the resistivity measurements.

A portion (100 parts) of the zinc oxide powder is admixed with 100 parts of water, and the mixture is treated in a ball mill for one hour. To the dispersion thus prepared is added 50 parts of 10% aqueous solution of polyvinyl alcohol (trade mark "PVA 105," product of Kuraray Co., Ltd., Japan) to obtain an electroconductive coating composition. The composition is applied to the electroconductive layer by a coating rod in an amount of 10 g/m$^2$ by dry weight. The coated sheet is then dried in a hot air dryer at 100° C. for one minute to form an electroconductive layer comprising an electronic-conductive substance as its main component. The conductive layer formed has a surface resistivity of $2.5\times10^7$ ohms (at 20° C. 40% RH).

A coating composition is prepared by admixing 20 parts of calcium carbonate with 400 parts of 20% methyl ethyl ketone solution of a copolymer of vinyl chloride and vinyl acetate (in the ratio of 50:50) and thoroughly stirring the mixture in a mixer. The composition is applied to the electroconductive base sheet prepared above and having the two layers by a bar coater in an amount of 5 g/m$^2$ by dry weight to form a record layer and obtain an electrostatic record material.

The electrostatic record materials thus obtained are tested for recording characteristics by the following method. The record material is allowed to stand at 20° C. and 15% RH (Low humidity), at 25° C. and 55% RH (Usual humidity), at 25° C. and 80% RH (High humidity) for 48 hours respectively. The record material is then recorded by a high-speed facsimile placed in each above atmosphere, under the conditions of a line density of 8 lines/mm, pulse width of 12 μ.sec, pin voltage of −300 V and subvoltage of +300 V. The density of the images is measured by Macbeth densitometer Model No.RD-100R (manufactured by Macbeth Co.) in terms of reflection density. The result is given in Table 1.

EXAMPLES 2-3, AND COMPARISON EXAMPLE 1

Four kinds of electrostatic record materials are prepared in the same manner as in Example 1 with the exception of using the compositions listed in Table 1 for forming the electroconductive layer comprising an ionic-conductive substance as its main electroconductive component. The materials are tested for recording characteristics in the same manner as in Example 1, with the results given in Table 1.

EXAMPLES 4-6, AND COMPARISON EXAMPLE 2

Four kinds of electrostatic record materials are prepared in the same manner as in Example 1 with the exception of using the electroconductive zinc oxide powders having the specific resistivities listed in Table 1 and serving as electronic-conductive substances. These powders are prepared in the same manner as in Example 1 with the exception of using different amounts of aqueous solution of $Al(NO_2)_3.9H_2O$ and conducting the heating step at different temperatures for varying periods of time. The materials are similarly tested for recording characteristics. Table 1 also shows the results.

COMPARISON EXAMPLE 3

An electrostatic record material is prepared in the same manner as in Example 1 except that the electroconductive layer of ionic-conductive substance is not formed. Table 1 shows the recording characteristics of the material.

COMPARISON EXAMPLE 4

An electrostatic record material is prepared in the same manner as in Example 1 except that the electroconductive layer of electronic-conductive substance is not formed. Table 1 shows the recording characteristics of the material.

EXAMPLES 7-9

Three kinds of electrostatic record materials are prepared in the same manner as in Example 1 except that the ionic-conductive substances shown in Table 1 are used in the listed proportions. Table 1 also shows the recording characteristics of these materials.

EXAMPLES 10-12

Three kinds of electrostatic record materials are prepared in the same manner as in Example 1 with the exception of using the electronic-conductive substances listed in Table 1 and applying the compositions containing the same in the listed amounts. Table 1 also shows the recording characteristics of the materials.

EXAMPLE 13

A dispersion composed of 100 parts of the same electroconductive zinc oxide powder as used in Example 1, 100 parts of 7% aqueous solution of polyvinyl alcohol (trade mark "PVA 105," product of Kuraray Co., Ltd., Japan) and 100 parts of water is applied to one side of wood free paper, weighing 49 g/m², by a coating rod in an amount of 10 g/m² by dry weight. The coated paper is then dried in a hot air dryer at 100° C. for one minute to form an electroconductive layer comprising an electronic-conductive substance as its main electroconductive component. The layer has a surface resistivity of $3\times10^7$ ohms (at 20° C., 40% RH). Separately a dispersion is prepared from 70 parts of 36% aqueous solution of polyvinylbenzyltrimethyl ammonium chloride (trade mark "ECR 77," product of The Dow Chemical Co., U.S.A.), 45 parts of calcium carbonate, 50 parts of 10% aqueous solution of polyvinyl alcohol and 150 parts of water. The dispersion is applied to the electroconductive layer by a coating rod in an amount of 4 g/m² by dry weight. The coated sheet is dried in a hot air dryer at 100° C. for one minute to form an electro-conductive layer comprising an ionic-conductive substance as its main electroconductive component. The layer has a surface resistivity of $1\times10^7$ ohms (at 20° C., 40% RH).

An electrostatic record material is prepared in the same manner as in Example 1 except that the electroconductive base sheet thus obtained is used. Table 1 shows the recording characteristics of the material.

TABLE 1

| | Electroconductive layer of ionic-conductive substance | | | | Electroconductive layer of electronic-conductive substance | | | | Recording characteristics | | |
|---|---|---|---|---|---|---|---|---|---|---|---|
| | Component | Ratio | Amount (g/m²) | Surface resistivity (ohm) | Component | Specific resistivity (ohm-cm) | Amount (g/m²) | Surface resistivity (ohm) | Low humidity | Usual humidity | High humidity |
| Example 1 | ECR:$CaCO_3$:PVA | 55:40:5 | 4 | $8 \times 10^6$ | ZnO | 11 | 10 | $2.5 \times 10^7$ | 1.1-1.2 | 1.4-1.5 | 0.8-0.9 |
| Example 2 | " | 95: 5:0 | " | $1.5 \times 10^6$ | " | " | " | " | 1.1-1.2 | 1.4-1.5 | 0.7-0.8 |
| Example 3 | " | 10:85:5 | " | $4 \times 10^8$ | " | " | " | " | 1.1-1.2 | 1.4-1.5 | 0.8-0.9 |
| Comp. Ex. 1 | " | 0:95:5 | " | $6 \times 10^{10}$ | " | " | " | " | 1.1-1.2 | 1.1-1.2 | 0.8-0.9 |
| Example 4 | " | 55:40:5 | " | $8 \times 10^6$ | " | 0.2 | " | $7 \times 10^6$ | 1.1-1.2 | 1.4-1.5 | 0.8-0.9 |
| Example 5 | " | " | " | " | " | 150 | " | $2 \times 10^8$ | 1.1-1.2 | 1.4-1.5 | 0.8-0.9 |
| Example 6 | " | " | " | " | " | 850 | " | $3 \times 10^9$ | 0.9-1.0 | 1.4-1.5 | 0.8-0.9 |
| Comp. Ex. 2 | " | " | " | " | " | 1500 | " | $2 \times 10^{10}$ | 0.3-0.4 | 1.4-1.5 | 0.8-0.9 |
| Comp. Ex. 3 | " | " | 0 | — | " | 11 | " | $2.5 \times 10^7$ | 1.1-1.2 | 1.1-1.2 | 0.8-0.9 |
| Comp. Ex. 4 | " | " | 4 | $8 \times 10^6$ | " | " | 0 | — | No image produced | 1.4-1.5 | 0.8-0.9 |
| Example 7 | NaCl:$CaCO_3$:PVA | 25:65:10 | " | $7.5 \times 10^7$ | " | " | 10 | $2.5 \times 10^7$ | 1.1-1.2 | 1.4-1.5 | 0.8-0.9 |
| Example 8 | KCl:$CaCO_3$:PVA | 25:65:10 | " | $7.5 \times 10^7$ | " | " | " | " | 1.1-1.2 | 1.4-1.5 | 0.8-0.9 |
| Example 9 | Alumina sol:$CaCO_3$:PVA | 35:55:10 | " | $2.5 \times 10^8$ | " | " | " | " | 1.1-1.2 | 1.4-1.5 | 0.8-0.9 |
| Example 10 | ECR:$CaCO_3$:PVA | 55:40:5 | " | $8 \times 10^6$ | CuI | 0.1 | 7 | $9 \times 10^6$ | 1.1-1.2 | 1.4-1.5 | 0.8-0.9 |
| Example 11 | " | " | " | " | $SnO_2$ | 100 | 10 | $9 \times 10^7$ | 1.1-1.2 | 1.4-1.5 | 0.8-0.9 |
| Example 12 | " | " | " | " | $TiO_2$ | 100 | " | $9 \times 10^7$ | 1.1-1.2 | 1.4-1.5 | 0.8-0.9 |
| Example 13 | — | — | — | — | — | — | — | — | 1.1-1.2 | 1.4-1.5 | 0.8-0.9 |

We claim:

1. An electrostatic record material consisting essentially of an electroconductive base sheet and a record layer formed on the base sheet and consisting essentially of an insulating resin, the record material being characterized in that the base sheet consists of a support, having coatings of (i) an electroconductive layer comprising an ionic-conductive substance as its main electroconductive component and having a surface resistivity of $10^5$ to $10^{11}$ ohms under conditions of 10-80% RH (ii) an electroconductive layer comprising an electronic-conductive substance as its main electroconductive component said electronic-conductive substance having a specific resistivity of $10^{-2}$ to $10^{-3}$ ohm-cm, said electroconductive layers being between the support and record layer.

2. An electrostatic record material according to claim 1 in which the ionic-conductive substance is at least one species selected from the group consisting of chlorides, nitrates, anionic or cationic electroconductive resins, electroconductive extender pigments and antistatic agents.

3. An electrostatic record material according to claim 1 in which the electronic-conductive substance is at least one species selected from the group consisting of metallic halides, metallic oxides, metallic sulfides, intermetallic compounds, metallic compound oxides and carbon black.

* * * * *